June 13, 1933.  A. H. BATES  1,913,742
AUTOMOBILE HEATER
Filed April 28, 1930
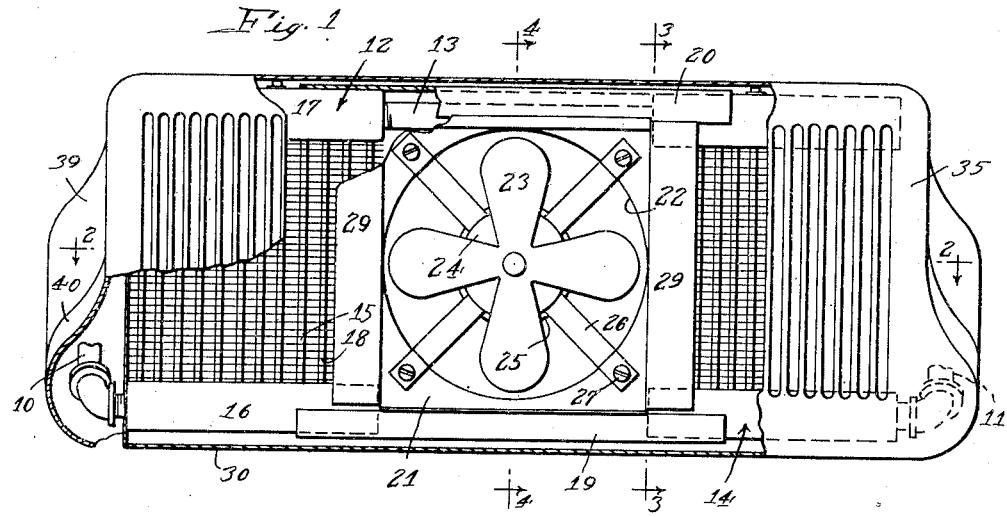
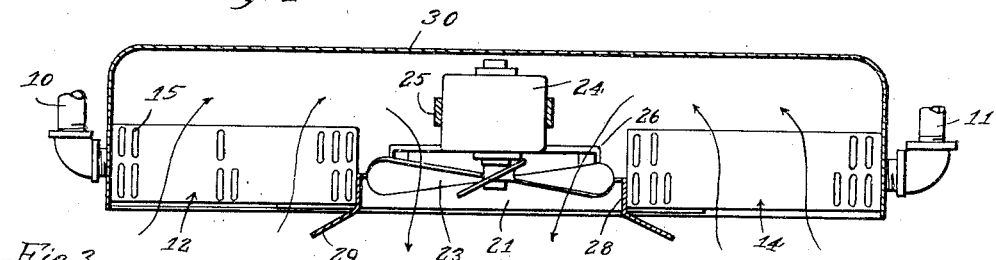
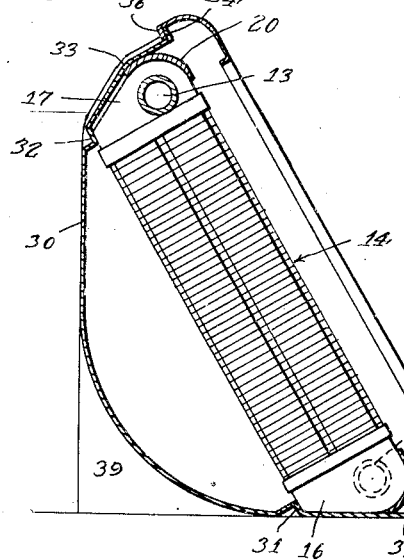
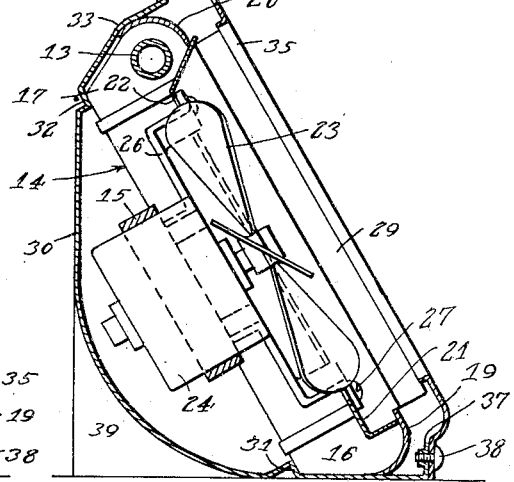
Inventor
By Albert H. Bates
Wilson, Powell, McCanna & Rehm
Attys Patented June 13, 1933

1,913,742

UNITED STATES PATENT OFFICE

ALBERT H. BATES, OF ROCKFORD, ILLINOIS, ASSIGNOR TO BURD HIGH COMPRESSION RING COMPANY, OF ROCKFORD, ILLINOIS, A CORPORATION OF ILLINOIS

AUTOMOBILE HEATER

Application filed April 28, 1930. Serial No. 448,022.

This invention relates to heaters for motor vehicles, and more particularly that type utilizing the heat in the water of the engine cooling system.

The principal object of my invention is to provide a heater suitable for rear seat installation and of a type depending for its draft upon the use of an electric motor-driven fan. Heaters equipped with fans have been almost entirely limited to use under the cowl, that is, as front seat heaters, owing to the inability to make a heater of this description compact enough to be suitable for installation behind the front seat.

The heater of my invention, briefly stated, is made up of a pair of interconnected radiator cores disposed in laterally spaced relation in a predetermined plane and enclosed in a casing with an electric motor-driven fan mounted therebetween, and more or less in the plane of the cores so that in the operation of the fan air is drawn in at both ends of the casing through the two cores and discharged by the fan from the middle of the casing, or vice versa. The disposition of the motor and fan more or less in the plane of the cores enables cutting down the dimension of the casing in a fore and aft direction enough to make the heater practical for rear seat installation. Furthermore, the casing is made approximately triangular-shaped in vertical cross-section with the cores disposed therein in the front thereof inclined from a vertical along with the fan, thus better adapting the heater to installation in the angle between the floor and the back of the seat and permitting the front of the heater to be used as a foot rest, when equipped with a suitable grating, as herein contemplated, as well as arranging for the discharge of the heated air rearwardly and upwardly from the heater in such a way that the rear seat passengers are given the full benefit of the heater.

The invention is illustrated in the accompanying drawing, wherein—

Figure 1 is a face view of the heater with portions of the grating and other parts broken away better to disclose the construction;

Fig. 2 is a horizontal section on the line 2—2 of Figure 1 omitting the grating, and Figs. 3 and 4 are vertical sections on the lines 3—3 and 4—4 of Figure 1.

The same reference numerals are applied to corresponding parts throughout the views.

The heater herein disclosed, as stated above, is especially adapted for installation in the tonneau of an automobile or other motor vehicle on the floor directly behind the front seat, but, of course, the heater is not definitely limited to use for rear seat installation inasmuch as it may be found suitable for various other purposes. For example, heaters of this kind would be suitable for installation in motor busses, where one could be installed behind each seat, all being connected in parallel so as to be supplied with the circulating heating medium from the same source. Pipes 10 and 11 leading to and from the heater are extended forwardly in certain installations to a point under the seat behind which the heater is installed before being extended down through the floor, so as to avoid cross members of the frame. Of course, in some installations the pipes may be led directly down through the floor and forwardly beneath the same. The supply pipe 10 has connection preferably through a stop cock with a pipe tapped into the water jacket of the engine at a point where the water attains the highest temperature and where it also gets hot immediately upon starting the engine, namely, in the head of the engine, and the return pipe 11 has connection with a hose tapped into the lower outlet hose connection of the radiator of the car, between the latter and its water pump, as for example, is illustrated in my application, Serial No. 311,032, filed October 8, 1928. From this much description it will be evident that hot water, or whatever engine-cooling fluid is used, is supplied through the pipe 10 to the radiator 12 for passage upwardly therethrough and out through pipe 13 for passage downwardly through the radiator 14 and return through the pipe 11 to the engine cooling system. In warm weather, the heater may be entirely shut off by simply closing the cock in the supply line. A heater of this sort, installed behind the front seat, may constitute the sole heating means for the car, or the same may be provided in conjunction with a front seat heater of the type shown and described in my application above referred to, in which latter event, the supply and return pipes 10 and 11 may be branched off from the same connections with the corresponding pipes for the other heater.

The radiators 12 and 14 may be of any suitable or preferred type, those herein illustrated havng what are known as turbo-tube cores consisting of two or more banks of vertically extending parallel flat tubes 15 connected at their opposite ends with the headers 16 and 17 and having transverse radiating fins 18 provided on the tubes to furnish the desired amount of radiation surface. The pipes 10 and 11 have connection with the bottom headers 16 of the radiators 12 and 14, respectively, and the pipe 13 is connected at opposite ends with the top headers 17, as shown. The two radiators are disposed in the same plane and, in addition to having the pipe connection referred to, are connected through their headers by curved sheet metal straps 19 and 20, soldered, welded, or otherwise suitably secured to the headers 16 and 17, respectively. A sheet metal shroud 21 is suitably mounted in the space between the two radiators, and has a circular opening 22 slightly larger than the circle of a fan 23 carried on the armature shaft of an electric motor 24. The latter is suitably supported on a bracket 25, the arms 26 of which radiate from the bracket and are bent so as to clear the fan in the opening 22 and permit fastening thereof to the shroud 21, as at 27. The shroud 21 closes the opening between the two radiators defined between the straps 19 and 20 and thereby insures a pretty strong draft through the opening 22 when the fan is set into operation. The sides 28 of the shroud segregate the air passages through the cores of the radiators 12 and 14 from the air passage at the fan, and these passages are further segregated by outwardly projecting, laterally bent wings 29 provided on the shroud at opposite sides of the fan, one alongside the radiator 12, and the other alongside the radiator 14. This segregation of the air passages is important because if eddy currents are produced, the air draft is proportionately diminished. It should now be evident in Fig. 2 that when the structure described is enclosed in a casing 30, leaving only the fronts of the radiators exposed, cold air will be drawn in through the cores of the radiators 12 and 14, as indicated by the arrows, owing to the suction produced in the casing by the fan 23. The air in its passage through the radiators is, of course, heated, and the hot air is discharged by the fan. The baffles 28 and 29 segregate the incoming and outgoing air currents and make for most efficient operation. The heater could, of course, be made to operate in the reverse fashion by simply reversing the direction of rotation of the fan, which would cause the cold air to be drawn in at the middle and hot air to be discharged at both ends through the radiator cores. It should also be evident from the description thus far that by having the radiators spaced as illustrated and mounting the electric motor and fan therebetween, more or less in the same plane with the radiators, the best obtainable compactness is arrived at, the fore and aft mean dimension of the heater being reduced approximately to the length of the armature shaft of the motor.

The casing 30 is made approximately triangular-shaped in vertical cross-section, as appears in Figs. 3 and 4, and the front, which corresponds to the hypotenuse of the triangle, is open for reception of the radiators and fan, there being longitudinal shoulders provided at 31 and 32 on the bottom and back walls of the casing to properly locate the assembly in the casing with the radiators and fan disposed in a predetermined plane inclined from the vertical approximately 30°. The assembly may be fastened in place in the casing in any suitable manner, as by welding or soldering. The back wall has the upper end thereof bent forwardly over the tops of the radiators, as shown at 33, and has the edge thereof flanged upwardly, as at 34. A grating 35 fits over the front of the casing, and has a downturned flange 36 along the top thereof arranged to fit behind the flange 34 to provide one point of attachment for the grating on the casing. The bottom wall of the casing has the forward edge thereof flanged upwardly, as at 37, and the lower marginal portion of the grating 35 is fastened to said flange by screws 38. Side pieces 39 are fitted onto the ends of the casing 30 and held in place by the grating which, as indicated in Figure 1, has a rim 40 fitting over the same. The side pieces are formed with a bulge at the lower end to enclose the pipes 10 and 11, and have the bottoms thereof arranged to rest on the floor. Owing to the triangular cross-section, the heater can be placed in the angle between the floor and the back of the seat close to the seat and out of the way. The compactness of the heater in a fore and aft direction is, of course, a further distinct advantage from the same standpoint; the heater does not have to project out from the back of the front seat to a point where it might be in the way. Furthermore, by inclination of the radiators and fan, the grating 35 on the front of the heater is made available as a foot rest so that the rear seat passengers can keep their feet warm thereon, and the fan is arranged to discharge heated air rearwardly and upwardly from the heater in such a way that the rear seat passengers are given the full benefit of the heater.

The heater is thrown into operation by simply completing the electrical circuit for the motor 24, a switch being suitably provided manually operable from the back seat for that purpose. There is, of course, only a very slight amount of heat given off when the fan is not operating, and at such times the heater makes a good foot warmer for the rear seat passengers who can rest their feet on the grating. Then, if more heat is wanted, it is obtained by turning on the fan, which, as described above, throws the heat rearwardly and upwardly so as to give the rear seat passengers the full benefit of the heater. The grating is preferably made with small enough openings to prevent anything coming in contact with the fan and causing damage thereto or to the heater, and to keep children from sticking their fingers through the grating and being injured by the fan.

The foregoing description no doubt conveys a clear understanding of all of the objects and advantages of the invention. It is obvious that various changes in design and construction might be made without seriously affecting some of these advantages, and for that reason the appended claims have been drawn with a view to covering all legitimate modifications and adaptations.

I claim:

1. In a heater, the combination of a pair of radiators disposed in spaced relation to one another substantially in the same plane, said radiators being arranged to have a heating medium circulated therethrough, an elongated casing having said radiators disposed in the opposite ends thereof leaving the fronts thereof exposed for the passage of air, an electric motor and fan between said radiators disposed as a unit at least partly in the plane with the radiators, the said casing having the back wall thereof spaced from the backs of the radiators for the passage of air therebetween, said fan when operated being arranged to force air to travel in a predetermined path, in one direction at the fan and in the opposite direction through the radiators whereby to deliver hot air from the casing, and baffles on the front of the heater at opposite sides of the fan to separate the air passage at the fan from the air passages for the radiators.

2. In a heater, the combination of a pair of radiators disposed in laterally spaced relation substantially in the same plane with one another, the said radiators comprising top and bottom headers and cores therebetween communicating with the headers, top and bottom cross members between the respective headers, the said radiators being arranged to have heating medium circulated therethrough, a casing enclosing the radiators leaving the fronts thereof exposed for the passage of air, there being a space between the backs of the radiators and the back wall of said casing for the passage of air therebetween, a wall between the radiators reaching from the top cross member to the bottom cross member to close the space between the radiators, said wall having an opening therein, a motor having a fan operated thereby in line with the aforesaid opening, and means for supporting the motor from said wall.

3. In a heater, the combination of a casing substantially triangular-shaped in vertical cross-section, the casing having the front thereof open, a substantially upright radiator or equivalent heating element disposed in said casing in the open front thereof, the said radiator leaving a space behind the same in the angle between the bottom and the back wall of the casing, and an electric motor and fan in said casing in the space referred to and arranged in the operation thereof to cause air to be passed through the radiator to be heated thereby and delivered from the casing.

4. In a heater, the combination of a casing substantially triangular-shaped in cross-section, the section approximating a right triangle, the hypotenuse side of which constitutes the front of the casing which is open, a radiator or equivalent heating element disposed in the open front of said casing inclined at an acute angle from the vertical, the said radiator leaving a space behind the same in said casing at the base right angle, and an electric motor and fan in said casing in the last mentioned space disposed in a plane substantially parallel to the plane of the radiator and arranged in the operation thereof to force air through the radiator to be heated thereby and discharged upwardly and outwardly from the front of the casing.

5. In a heater, the combination of a casing substantially triangular-shaped in vertical cross-section, the casing having the front thereof open, a substantially upright radiator or equivalent heating element disposed in said casing in the open front thereof, the said radiator leaving a space behind the same in the angle between the bottom and the back wall of the casing for the passage of air therethrough, and an electric motor and fan disposed in said casing alongside of and in a plane substantially parallel with the plane of the radiator, the same being arranged when operated to cause air to be discharged therefrom in one direction and to flow in the opposite direction through the radiator whereby to discharge hot air from the casing.

6. In a heater, the combination of a casing substantially triangular-shaped in vertical cross-section, the casing having the front thereof open, a substantially upright radiator or equivalent heating element disposed in said casing in the open front thereof, the said radiator leaving a space behind the same in the angle between the bottom and the back wall of the casing for the passage of air therethrough, and an electric motor and fan disposed in said casing alongside the radiator with the fan in a plane substantially parallel to the plane of the radiator and with the motor projecting at least partially into the space between the bottom and back walls of the casing, said fan when operated being arranged to discharge air therefrom in one direction to cause the passage of air through the radiator in the opposite direction whereby to discharge hot air from the casing.

7. In a heater, the combination of a casing substantially triangular-shaped in cross-section, the section approximating a right triangle, the hypotenuse side of which constitutes the front of the casing which is open, one or more radiators or equivalent heating elements disposed in the open front of said casing inclined at an acute angle from the vertical, the radiator leaving a space behind the same between the bottom and back walls of the casing for the passage of air therethrough, and a motor and fan unit disposed in said casing alongside the radiator, with the motor projecting into said space in a plane behind the radiator and the fan disposed in a plane substantially parallel to the plane of the radiator, the fan being arranged when operated to discharge air therefrom in one direction to cause the flow of air in the opposite direction through the radiator whereby to discharge hot air from the casing, the air in its travel between the fan and radiator passing through the aforesaid space behind the radiator.

8. In a heater, the combination of a pair of heating elements disposed in spaced relation to one another substantially in the same plane, a casing enclosing said elements leaving the front exposed for the passage of air, said casing having the back wall thereof spaced from the backs of the heating elements for the passage of air therebetween, a power-operated fan disposed in said casing between and approximately in the same plane with the heating elements, the heating elements thereby defining separate air passageways in the casing on opposite sides of an intermediate air passageway at the fan, said fan when operated being arranged to force air to travel in one direction in the intermediate air passageway and in the opposite direction through the other passageway whereby to deliver hot air from the casing, and baffles projecting from the plane of the front of the heater at opposite sides of the fan to separate the intermediate passageway from the other passageways.

In witness of the foregoing I affix my signature.

ALBERT H. BATES.